UNITED STATES PATENT OFFICE.

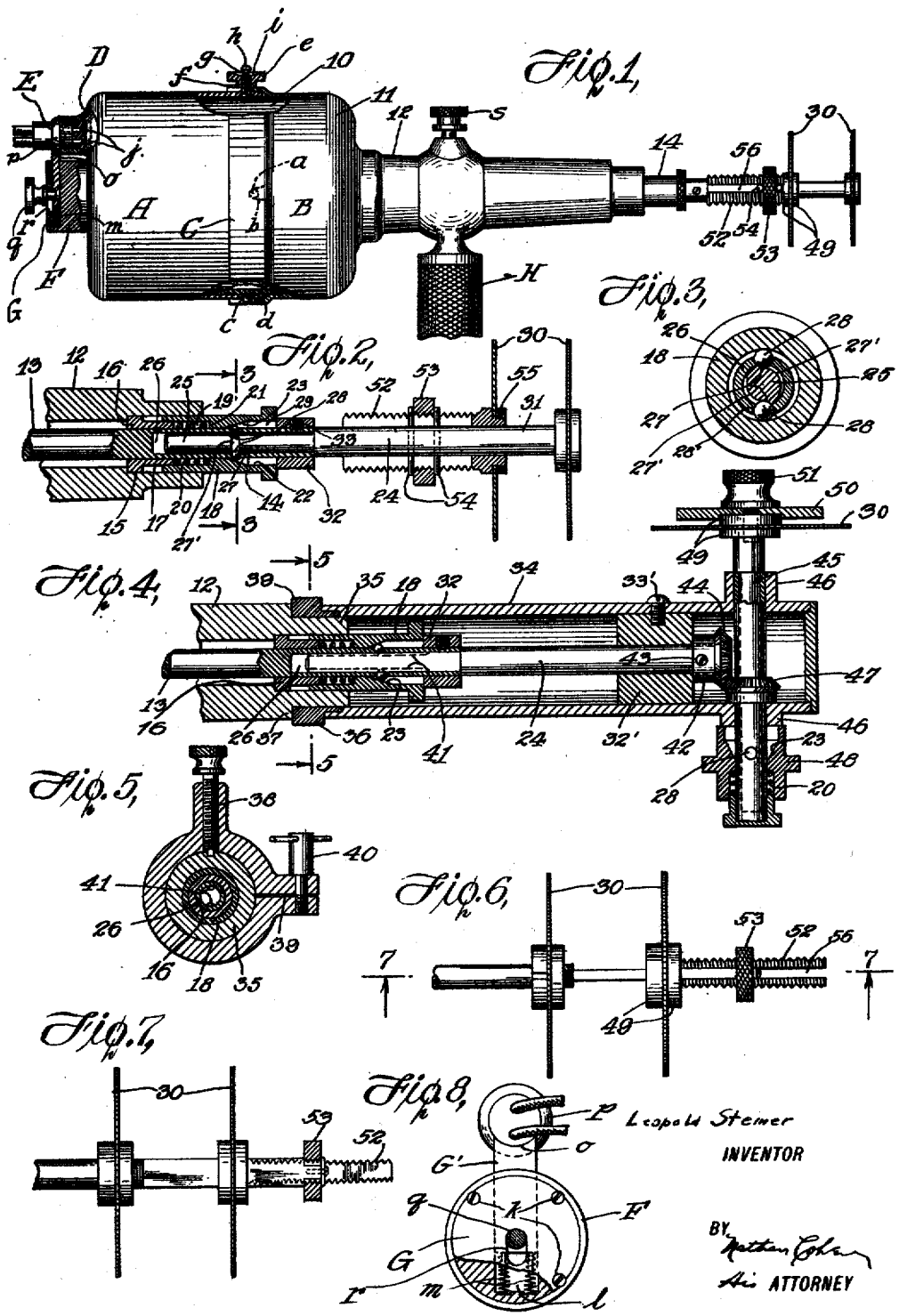

LEOPOLD STEINER, OF NEW YORK, N. Y.

SURGICAL APPARATUS.

1,322,644.	Specification of Letters Patent.	Patented Nov. 25, 1919.

Application filed September 10, 1918. Serial No. 253,649.

*To all whom it may concern:*

Be it known that I, LEOPOLD STEINER, a citizen of the United States, and resident of New York, in the county of New York and State of New York, have invented certain new and useful Improvements in Surgical Apparatus, of which the following is a specification.

This invention relates to surgical appliances, and is directed particularly to a convenient and advantageous apparatus for cutting bones in surgical operations.

One object of the invention is to provide a motor driven apparatus which may be easily and conveniently assembled and manipulated to cut bones in surgical operations, and readily taken apart.

Another object is to provide an apparatus of this character which may be readily adjusted to any desired width of cut.

A further object is to provide an apparatus of the nature mentioned which may easily be adjusted to any desired depth of cut.

A still further object is to provide an apparatus of the character described which shall permit the use thereof interchangeably for cutting in a direction longitudinally or transversely of the main motor shaft.

The various other objects and advantages will more fully appear from the detailed description, and the features of novelty will be particularly pointed out in the claims.

In the drawing illustrating my invention,

Figure 1 is an elevation of my improved apparatus all assembled and ready for use as a twin saw to cut transversely of the main motor shaft, and showing also the means for varying the width of the cut.

Fig. 2 is a fragmental, longitudinal section of the apparatus as assembled in Fig. 1.

Fig. 3 is a section cut along line 3—3 of Fig. 2.

Fig. 4, is a fragmental, longitudinal, sectional view of the apparatus when used as an angular saw, that is to cut longitudinally of the main motor shaft, and showing also the means for varying the depth of the cut.

Fig. 5 is a section cut along line 5—5 of Fig. 4.

Fig. 6 is an elevation of a modified form of adjustment for width of cut, and Fig. 7 is a section cut along line 7—7 of Fig. 6.

Fig. 8 is a detailed section of the improved means for inserting the plug connection to the motor and holding it in place.

Referring in detail to the drawing, my improved apparatus is driven by an electric motor 10 housed in a casing 11 adapted to be sterilized to meet the requirements of surgical operations. This casing is made in two parts A and B, the latter being formed with a flanged portion C adapted to fit over the end of the section A. The latter is first slipped over the motor and held in place by means of the projection $a$ rigid with the motor frame, which fits snugly into the slot $b$ in the casing section. The other section B is then slipped over the motor and is held to the first mentioned section by means of a pin or projection $c$ rigid with the latter, which registers with a slot $d$ in the flange C. The two sections are further held together and in place by means of the nut $e$ adapted to thread on the screw $f$ soldered to the section A, and passing through a perforation in the flange C of section B. A small pin $g$ having an enlarged head $h$ is set into the screw $f$ and the nut $e$ is countersunk, as at $i$, so that when it is unthreaded to loosen the parts of the casing its upward travel will be limited when this countersunk head rests against the head $h$. The casing section A is further formed with a short tubular extension D through which a connecting plug E may be inserted to contact with the conducting pins $j$ electrically connected to the motor. To keep the plug in position, the section A is formed with a boss F in which is held by means of the screws $k$, a plate G. This plate is recessed on its inner face, as at $l$, to receive the projection G' passing through a slot in the boss, and which is normally held upward by the springs $m$, kept vertical by the pins $n$, extending therein for part of the length of the springs. The projection is formed with a beveled edge $o$ adapted to rest under and against the flange $p$ on the connecting plug, thus keeping the plug in position as shown in the figure. To bring the projection G' out of contact with the plug E, head $q$ passes through a slot $r$ in the plate, and is rigidly secured to the projection G'. By pushing down the head $q$ the latter is moved out of contact with the plug. The springs $m$ are at the same time compressed, and will urge the projection G' upward when the head $q$ is released.

Extending from the casing is the conical housing 12 for the motor driven shaft 13, on which is mounted the chuck member 14. In order that the apparatus may be readily taken apart and used interchangeably with a twin or angular saw, the chuck member is especially constructed so as to make it possible to easily and quickly remove the twin saw attachment and replace it by the angular saw attachment, or vice versa.

The special construction of my novel chuck for this purpose will now be described, in detail. As will be clear from Fig. 2, the conical housing 12 is milled out on the interior surface thereof, as at 15, to form a seat for the flange 16 of a sleeve 17 fitted over the shaft 13. A larger sleeve 18 of diameter equal to that of the flange 16, is mounted on the motor shaft, and is milled out at one end, as at 19, so as to fit over the sleeve 16 and be slidably held therebetween, and the conical housing. A spring 20 is held in the space between the sleeve 16 and the seat 21 in the sleeve 18. The interior surface of the latter is similarly milled out at the other end, as at 22, so as to clear the shaft, and is formed with a taper 23, for the purpose to be hereinafter more fully explained. A shank member 24 for the chuck has one end 25 of reduced cross section, so as to enter the recess 26 in the motor shaft, and is provided with two preferably hemispherical recesses 27 at points on its surface adjacent the taper 23. These recesses are adapted to receive the portion of the balls 28 which are permanently seated in orifices 28' formed in the wall of the motor shaft recess 26 and which partially extend into the latter. The balls are of a diameter smaller than the clearance 29, so that when the spring 20 is not compressed, as in Fig. 2, they are frictionally held between the tapered portion 23 and their orifices or seats 28', and forced into registry with the recesses 27 in the shank member. In this position it is clear that the shank will rotate together with the motor shaft and impart motion to the circular saws 30, or any other device mounted upon the enlarged end 31, of said shank member. Extending in opposite directions from each of the recesses 27 are peripheral grooves 27' of lesser depth and of length extending not quite up to the opposite recess 27. Thus, when the shank is inserted in position and the motor started, the balls will rotate with the shank in the grooves 27' until they each drop into one of the deeper recesses 27. The shank will then be positively held in place in the manner already described, and revolves steadily without any lost motion. To better maintain the parts in position, a collar 32 is provided which abuts the flanged portion 22 of the sleeve 18, and is held in place on the shank member by means of the screw 33.

It will now be clear that in order to remove the shank member 24 one need simply to press down on the flanged portion 22 of the sleeve 18, thus compressing the spring, and causing said sleeve to move in against the flanged portion 16 of the smaller sleeve 15. The balls 28 will thereby be out of frictional engagement with the conical portion and remain seated by their own weight in the orifices 28', which must, of course, be of a diameter less than that of the balls, and, on pulling the shank portion, the balls will rise into the clearance 29 and disengage said shank, allowing the latter to be freely removed from the rest of the apparatus.

The separate angular saw attachment will now be described. This attachment provides means whereby my novel apparatus may be conveniently used when it is desired to cut in a direction longitudinally of the main shaft 13, as shown in Fig. 4. It consists of a long, cylindrical casing 34, which is adapted to be slipped over the reduced portion 35 of the conical casing 12, so that the sleeve 36 fitted in the end of the former, abuts the enlarged portion 37 of the latter. To hold the attachment securely in position the large screw 38, is provided whereby the cylindrical casing 34 may be keyed to the housing 12. To further hold the attachment in place, the sleeve 36 is formed with a split extension 39, through which passes the key 40, which may be manipulated to lock the sleeve on the housing, as clearly shown in Fig. 5. In this form of the apparatus, the construction of the chuck is identical with that already described, but the shank member 24, instead of having the hemispherical recesses, is provided with longitudinal, preferably semi-cylindrical grooves 41, in which the balls fit, and along which they may be made to slide. The shank member passes through the collar 32' which is secured in the casing by means of the screw 33', and is provided at its enlarged end with a collar 42. The latter is secured to the shank member by a screw 43 and carries the bevel gear 44, a countershaft 45 passes through the vertical extensions 46 of the casing 34, and has mounted thereon the gear 47, which meshes with the gear 41. One end of the countershaft carries the chuck member 48, which is of the same construction as that shown in Fig. 2, and which has already been fully described. The other end may have mounted thereon a circular saw 30, or any other similar device. The saws are mounted between two collars 49. When a single saw is used the depth of cut may be controlled and varied in a simple manner, as by means of circular gages 50 of various sizes, held adjacent the saw by means of the screw 51. When the twin saw is used, it is desirable to control and vary the width of cut. The means provided for this purpose consists of a two-part sleeve 52 slidably mounted on the shank 24 adjacent the saws, and having its exterior surface threaded for the milled nut 53. This nut is held in place by the pins 54 passing transversely through the shank. The saw, or other device adjacent the sleeve, is rigidly held thereon, as at 55, while the other saw is rigidly held to the shank. When the milled head nut 53 is operated the sleeve 52 moves outward or inward along the shank, the pins 54 passing through the space 56 between the two parts of the sleeve, thus bringing the saws closer together, or separating them, as desired. In the form shown in Figs. 1 and 2, the means for adjusting the width of cut is disposed between the inner saw and the housing, leaving no projecting portion extending from the outer saw.

It will be clear that when the parts are assembled as in Fig. 4, and motion is imparted to the shaft 13, said motion is transmitted by means of the gears to the countershaft mounted at right angles to the shank 24, and thus the saw is made to revolve in a direction longitudinally of the motor shaft.

To remove the angular saw attachment, so that the apparatus may be again free for use as a twin saw, all one needs do is to manipulate the keys 38 and 40, so as to make the casing 34 loose on the housing, and then slide the former off from the latter, the balls 28 sliding along the grooves 41.

To facilitate the manipulation of the apparatus, a handle H is provided, which is held securely in place by means of the screw *s* to the conical housing 12.

It will thus be seen that I have provided a novel bone cutting apparatus in which the parts may be easily assembled or taken apart, the depth and width of cut controlled at will, and which has embodied therein the extremely advantageous feature of being readily adjusted so as to cut in a direction either transversely or longitudinally of the motor shaft. The whole apparatus is very compact and easily handled, and lends itself readily for use in surgical operations. The special construction of the motor casing renders it possible to maintain the apparatus in a sterilized condition.

While the novel mechanical features of construction have hereinabove been described especially with reference to my novel bone cutting apparatus, it will be readily understood that the various novel parts will lend themselves to use in connection with any tool, surgical or otherwise, in which it is desired to impart rotation, and which in its ordinary application, should be readily inserted and removed from engagement with a motor driven shaft. Similarly, the particular construction of motor casing is readily applicable to any form of apparatus in which it is desired to have the motor shielded from the outside, so that it may remain sterilized.

Having thus described my invention, what I claim as new and desire to secure by Letters Patent, is:

1. A surgical apparatus, comprising a casing having a motor therein, a connecting plug extending into said casing, a housing adjacent said casing, a motor shaft extending therein, a shank member adapted to rotate with said shaft, surgical cutting members mounted on said shank, and means for adjusting the distance between said cutting members to vary the width of cut.

2. A surgical apparatus, comprising a casing having a motor therein, a connecting plug extending into said casing, a housing adjacent said casing, a motor shaft extending therein, a shank member adapted to rotate with said shaft, a surgical cutting member mounted on said shank, and means on said shank member for varying and controlling the depth of cut.

3. In surgical apparatus, a casing having a motor therein, said casing consisting of two separate sections, means for securing the latter together and to the motor, a connecting plug extending into said casing, and means for removably supporting said plug in position in the casing, said means comprising a movable supporting member disposed beneath said plug.

4. In motor driven surgical apparatus, a shaft having a recess in one end thereof and orifices in the walls of said recess, a chuck mounted on said shaft, a shank member adapted to enter said recess, and spring controlled means in said chuck and operating through said orifices for removably holding said shank in frictional engagement with the shaft, whereby the latter may impart motion to the former.

5. In motor driven surgical apparatus, a shaft having a recess in one end thereof, a chuck mounted on said shaft, a shank member adapted to enter said recess, and spring controlled means for removably holding said shank in frictional engagement with the shaft, whereby the latter may impart motion to the former.

6. A surgical apparatus, comprising a casing having a motor therein, wiring connections extending into the casing, a housing adjacent said casing, a motor shaft extending therein, a shank member having a surgical instrument mounted thereon, means for removably holding said shank in contact with the shaft for driving the former, and detachable means for transmitting the motion of the shank at right angles thereto.

7. In surgical apparatus, in combination with a casing having a motor therein, a housing adjacent said casing, a motor shaft extending in said housing, a shank member removably held in contact with the shaft, a separate attachment, adapted to be removably held to the housing, and means disposed therein for transmitting the motion of the shank at right angles thereto.

8. In motor driven surgical apparatus, a shaft having a recess in one end thereof and orifices in the walls of said recess, a chuck mounted on said shaft, a shank member adapted to enter said recess and spring controlled friction members in said chuck operating through said orifices adapted to be forced into releasable engagement with the shaft.

9. In motor driven surgical apparatus, a shaft partially hollow at one end, orifices formed in the walls of the hollow portion thereof, a sleeve slidably mounted on said hollow end, said sleeve having a taper on the interior surface thereof, a shank member adapted to enter said hollow end of said shaft, and friction members operating through said orifices and normally forced into frictional engagement with said shank, by the walls of said taper on the interior of said sleeve.

10. In motor driven surgical apparatus, a shaft partially hollow at one end, orifices formed in the walls of the hollow portion thereof, a sleeve slidably mounted on said hollow end, said sleeve having a taper on the interior surface thereof, a shank member adapted to enter said hollow end of said shaft, and friction members operating through said orifices and normally forced into frictional engagement with said shank by the walls of said taper on the interior of said sleeve, and means for forcing said friction members from between said orifices and said taper out of frictional engagement with said shank.

11. In motor driven surgical apparatus, a shaft having a recess in one end thereof and orifices in the walls of said recess, a shank member adapted to enter said recess and having recesses formed therein, and spring controlled friction members operating through said orifices and adapted normally to be forced through the latter into said recesses in the shank member.

12. In combination with a shaft and shank member adapted to be driven thereby, a chuck member comprising a sleeve slidable over said shaft, said sleeve having a taper formed on the interior surface thereof, and friction members adapted to be forced by the walls of said taper into engagement with said shaft and means for bringing said friction members out of engagement with the walls of said taper.

Signed at New York, in the county of New York and State of New York, this 23rd day of August, A. D. 1918.

LEOPOLD STEINER.

Witness:
CHAS. E. WARD.